(12) United States Patent
Majumdar et al.

(10) Patent No.: US 9,178,823 B2
(45) Date of Patent: Nov. 3, 2015

(54) METHODS, SYSTEMS, AND COMPUTER READABLE MEDIA FOR GENERATING SIMULATED NETWORK TRAFFIC USING DIFFERENT TRAFFIC FLOWS AND MAINTAINING A CONFIGURED DISTRIBUTION OF TRAFFIC BETWEEN THE DIFFERENT TRAFFIC FLOWS AND A DEVICE UNDER TEST

(71) Applicant: Ixia, Calabasas, CA (US)

(72) Inventors: Partha Majumdar, Woodland Hills, CA (US); Rohan Chitradurga, Simi Valley, CA (US)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 13/712,499

(22) Filed: Dec. 12, 2012

(65) Prior Publication Data

US 2014/0160927 A1    Jun. 12, 2014

(51) Int. Cl.
*H04L 1/00* (2006.01)
*H04L 12/801* (2013.01)

(52) U.S. Cl.
CPC ..................................... *H04L 47/10* (2013.01)

(58) Field of Classification Search
None
See application file for complete search history.

(56) References Cited

U.S. PATENT DOCUMENTS

| | | |
|---|---|---|
| 5,247,517 A | 9/1993 | Ross et al. |
| 5,327,437 A | 7/1994 | Balzer |
| 5,343,463 A | 8/1994 | van Tetering et al. |
| 5,477,531 A | 12/1995 | McKee |
| 5,535,338 A | 7/1996 | Krause et al. |
| 5,568,471 A | 10/1996 | Hershey et al. |
| 5,590,285 A | 12/1996 | Krause et al. |
| 5,600,632 A | 2/1997 | Schulman |
| 5,657,438 A | 8/1997 | Wygodny |
| 5,671,351 A | 9/1997 | Wild |
| 5,761,486 A | 6/1998 | Watanabe |
| 5,787,253 A | 7/1998 | McCreery et al. |
| 5,838,919 A | 11/1998 | Schwaller et al. |
| 5,878,032 A | 3/1999 | Mirek et al. |
| 5,881,237 A | 3/1999 | Schwaller et al. |
| 5,905,713 A | 5/1999 | Anderson et al. |
| 5,937,165 A | 8/1999 | Schwaller et al. |

(Continued)

FOREIGN PATENT DOCUMENTS

EP    0 895 375 B1    8/2004

OTHER PUBLICATIONS

Notice of Allowance and Fee(s) Due for U.S. Appl. No. 11/462,351 (Feb. 6, 2009).

(Continued)

*Primary Examiner* — Kevin C Harper
(74) *Attorney, Agent, or Firm* — Jenkins, Wilson, Taylor & Hunt, P.A.

(57) ABSTRACT

Methods, systems, and computer readable media for generating simulated network traffic from a plurality of different traffic flows and maintaining a configured distribution among the flows are disclosed. One exemplary method includes determining a number of operations per flow for each of a plurality of flows that generate simulated network traffic between the flows and a device under test. The method further includes determining a desired traffic distribution among the traffic generated by the traffic flows. The method further includes assigning a weight to each flow that determines the number of times to execute each flow during execution of a batch of flows. The method further includes executing the flows in batches according to the assigned weights to transmit the desired distribution of traffic between the different flows and the device under test.

21 Claims, 3 Drawing Sheets

(56) References Cited

U.S. PATENT DOCUMENTS

| | | | |
|---|---|---|---|
| 5,974,237 A | 10/1999 | Shurmer et al. | |
| 6,028,847 A | 2/2000 | Beanland | |
| 6,044,091 A | 3/2000 | Kim | |
| 6,061,725 A | 5/2000 | Schwaller et al. | |
| 6,065,137 A | 5/2000 | Dunsmore et al. | |
| 6,108,800 A | 8/2000 | Asawa | |
| 6,122,670 A | 9/2000 | Bennett et al. | |
| 6,148,277 A | 11/2000 | Asava | |
| 6,157,955 A | 12/2000 | Narad et al. | |
| 6,172,989 B1 | 1/2001 | Yanagihara et al. | |
| 6,173,333 B1 | 1/2001 | Jolitz | |
| 6,189,031 B1 | 2/2001 | Badger | |
| 6,233,256 B1 | 5/2001 | Dieterich et al. | |
| 6,279,124 B1 | 8/2001 | Brouwer | |
| 6,321,264 B1 | 11/2001 | Fletcher | |
| 6,345,302 B1 | 2/2002 | Bennett et al. | |
| 6,360,332 B1 | 3/2002 | Weinberg | |
| 6,363,056 B1 | 3/2002 | Beigi et al. | |
| 6,397,359 B1 | 5/2002 | Chandra et al. | |
| 6,401,117 B1 | 6/2002 | Narad | |
| 6,408,335 B1 | 6/2002 | Schwaller et al. | |
| 6,421,730 B1 | 7/2002 | Narad | |
| 6,434,513 B1 | 8/2002 | Sherman et al. | |
| 6,446,121 B1 | 9/2002 | Shah | |
| 6,507,923 B1 | 1/2003 | Wall et al. | |
| 6,545,979 B1 | 4/2003 | Poulin | |
| 6,601,098 B1 | 7/2003 | Case | |
| 6,621,805 B1 | 9/2003 | Kondylis et al. | |
| 6,625,648 B1 | 9/2003 | Schwaller et al. | |
| 6,625,689 B2 | 9/2003 | Narad | |
| 6,662,227 B2 | 12/2003 | Boyd et al. | |
| 6,708,224 B1 | 3/2004 | Tsun et al. | |
| 6,763,380 B1 | 7/2004 | Mayton et al. | |
| 6,789,100 B2 | 9/2004 | Nemirovsky | |
| 6,920,407 B2 | 7/2005 | Adamian et al. | |
| 6,950,405 B2 | 9/2005 | Van Gerrevink | |
| 7,006,963 B1 | 2/2006 | Maurer | |
| 7,010,782 B2 | 3/2006 | Narayan et al. | |
| 7,516,216 B2 | 4/2009 | Ginsberg et al. | |
| 8,010,469 B2 | 8/2011 | Kapoor et al. | |
| 8,135,657 B2 | 3/2012 | Kapoor et al. | |
| 8,145,949 B2 | 3/2012 | Silver | |
| 8,341,462 B2 | 12/2012 | Broda et al. | |
| 8,402,313 B1 | 3/2013 | Pleis et al. | |
| 8,510,600 B2 | 8/2013 | Broda et al. | |
| 8,522,089 B2 | 8/2013 | Jindal | |
| 8,676,188 B2 | 3/2014 | Olgaard | |
| 8,839,035 B1 | 9/2014 | Dimitrovich et al. | |
| 2002/0080781 A1 | 6/2002 | Gustavsson | |
| 2003/0009544 A1 | 1/2003 | Wach | |
| 2003/0012141 A1* | 1/2003 | Gerrevink | 370/250 |
| 2003/0033406 A1 | 2/2003 | John et al. | |
| 2003/0043434 A1 | 3/2003 | Brachmann et al. | |
| 2003/0231741 A1 | 12/2003 | Rancu et al. | |
| 2006/0268933 A1 | 11/2006 | Kellerer et al. | |
| 2008/0285467 A1 | 11/2008 | Olgaard | |
| 2008/0298380 A1* | 12/2008 | Rittmeyer et al. | 370/412 |
| 2009/0100296 A1 | 4/2009 | Srinivasan et al. | |
| 2009/0100297 A1 | 4/2009 | Srinivasan et al. | |
| 2010/0050040 A1 | 2/2010 | Samuels et al. | |
| 2011/0238855 A1 | 9/2011 | Korsunsky et al. | |
| 2011/0283247 A1 | 11/2011 | Ho et al. | |
| 2012/0192021 A1 | 7/2012 | Jindal | |
| 2012/0240185 A1 | 9/2012 | Kapoor et al. | |
| 2012/0314576 A1 | 12/2012 | Hasegawa et al. | |
| 2013/0111257 A1 | 5/2013 | Broda et al. | |
| 2013/0286860 A1 | 10/2013 | Dorenbosch et al. | |
| 2014/0036700 A1 | 2/2014 | Majumdar et al. | |
| 2014/0173094 A1 | 6/2014 | Majumdar et al. | |
| 2014/0289561 A1 | 9/2014 | Majumdar et al. | |

OTHER PUBLICATIONS

Restriction Requirement for U.S. Appl. No. 11/462,351 (Jan. 2, 2009).

Ye et al., "Large-Scale Network Parameter Configuration Using an On-line Simulation Framework," Technical report, ECSE Department, Rensselear Polytechnic Institute (2002).

Business Wire, "Ixia's Web Stressing and In-Service Monitoring Products Names Best of Show Finalist at NetWorld+Interop 2001, Atlanta," 2 pages (Sep. 10, 2001).

PRNewsWire, "Caw Network Doubles Performance of Real-World Capacity Assessment Appliance Suite: WebAvalanche and WebReflector Now Generate and Respond to 20,000+ HTTP requests per Second With Over One Million Open Connections," 2 pages (Sep. 10, 2001).

Caw Networks, Inc. and Foundry Networks, Inc., "Caw Networks Performance Brief: Caw Networks and Foundry Networks 140,000 Transactions per Second Assessment," 1 page (Sep. 7, 2001).

MacVittie, "Online Only: CAW's WebReflector Makes Load-Testing a Cakewalk," Network Computing, 2 pages (Sep. 3, 2001).

"Caw Networks Unveils New Web-Stressing Appliance," press release from Caw Networks, Inc., 2 pages (Mar. 5, 2001).

Ye et al., "Network Management and Control Using collaborative On-Line Simulation," Proc. IEEE International Conference on Communications ICC2001, Helsinki, Finland, pp. 1-8 (2001).

Business Wire, "NetIQ's Chariot 4.0 Goes Internet-Scale: ASPs and Service Providers Can Conduct Tests With Up to 10,000 Connections; New Visual Test Designer Simplifies Testing of All Sizes," 1 page (Oct. 23, 2000).

Business Wire, "Spirient Communications TeraMetrics and NetIQ's Chariot Work Together to Create First Complete Network Performance Analysis Solution," 2 pages (Sep. 25, 2000).

Kovac, "Validate your equipment performance—Netcom Systems' SmartBits—Hardware Review—Evaluation," Communications News, 2 pages (May 2000).

Marchette, "A Statistical Method for Profiling Network Traffic," USENIX (Apr. 12-19, 1999).

Cooper et al., "Session traces: an enhacement to network simulator," Performance, computing and Communication Conference, Scottsdale, AZ (Feb. 1, 1999).

San-qi, et al., "SMAQ: A Measurement-Based Tool for Traffic Modeling and Queuing Analysis Part I; Design methodologies and software architecture," IEEE Communications Magazine, pp. 56-65 (Aug. 1, 1998).

San-qi, et al., "SMAQ: A Measurement-Based Tool for Traffic Modeling and Queuing Analysis Part II; Network Applications," IEEE Communications Magazine, pp. (Aug. 1, 1998).

Notice of Allowance and Fee(s) Due for U.S. Appl. No. 13/871,909 (Apr. 20, 2015).

Notice of Allowance and Fee(s) Due for U.S. App. No. 13/567,747 (Mar. 5, 2015).

Non-Final Office Action for U.S. Appl. No. 13/718,813 (Jan. 14, 2015).

Non-Final Office Action for U.S. Appl. No. 13/871,909 (Nov. 20, 2014).

Non-Final Office Action for U.S. Appl. No. 13/567,747 (Nov. 19, 2014).

"Ixload Specifications," http://web.archive.org/web/20130127053319//www.ixiacom.com/products/network_text/applications/ixload/specifications/index.php. pp. 1-7, (Jan. 27, 2013).

"A TCP Tutorial," ssfnet.org/Exchange/tcp/tcpTutorialNotes.html, pp. 1-10 (Apr. 4, 2012).

"IxLoad," Solution Brief, 915-3030-01. D, Ixia, pp. 1-4 (Feb. 2012).

Business Wire, "REMINDER/Caw Networks to Spotlight WebAvalanche 2.0 and WebReflector At Networld+Interop," 2 pages (May 8, 2001).

Mniemneh, "Computer Networks Flow control with TCP," pp. 1-5 (Publication Date Unknown).

* cited by examiner

METHODS, SYSTEMS, AND COMPUTER READABLE MEDIA FOR GENERATING SIMULATED NETWORK TRAFFIC USING DIFFERENT TRAFFIC FLOWS AND MAINTAINING A CONFIGURED DISTRIBUTION OF TRAFFIC BETWEEN THE DIFFERENT TRAFFIC FLOWS AND A DEVICE UNDER TEST

TECHNICAL FIELD

The subject matter described herein related to generating simulated network traffic. More particularly, the subject matter described herein related to methods, systems, and computer readable media for generating simulated network traffic using different traffic flows and maintaining a configured distribution of traffic between the different traffic flows and a device under test.

BACKGROUND

Some network components, such as firewalls, network address translators (NATs), intrusion detection systems (IDSs), and intrusion protection systems (IPSs), deep packet inspection (DPI) devices, wide area network (WAN) optimization devices, layer 7 acceleration devices, and server load balancers will see a diverse mix of network traffic in operation. Accordingly, before deploying such equipment in a live network, it is desirable to test the equipment with a traffic mix that is representative of the traffic mix that the equipment will see in operation. For example, it may be desirable to test a firewall by repeatedly sending traffic from different applications through the firewall. Each application may generate different amounts of traffic and may operate independently of other applications that generate simulated traffic to test the functionality of the firewall. It may be desirable to maintain a desired distribution of traffic among the applications. However, without some regulation of transmissions by the applications, maintaining a desired traffic distribution cannot be achieved.

Accordingly, there exists a long felt need for methods, systems, and computer readable media for generating simulated traffic using different traffic flows and for maintaining a configured traffic distribution between the traffic flows and a device under test.

SUMMARY

Methods, systems, and computer readable media for generating simulated network traffic between a plurality of different traffic flows and a device under test and maintaining a configured distribution between the flows and the device under test are disclosed. One exemplary method includes determining a number of operations per flow for each of a plurality of flows that generate simulated network traffic between the each flow and a device under test. The method further includes determining a desired traffic distribution among the traffic generated by the traffic flows. The method further includes assigning a weight to each flow that determines the number of times to execute each flow during execution of a batch of flows. The method further includes executing the flows in batches according to the assigned weights to generate the desired distribution of traffic between the different flows and the device under test.

The subject matter described herein can be implemented using a non-transitory computer readable medium having stored thereon executable instructions that when executed by the processor of a computer control the computer to perform steps. Exemplary computer readable media suitable for implementing the subject matter described herein includes chip memory devices, disk memory devices, programmable logic devices, and application specific integrated circuits. In one example, the subject matter described herein can be implemented by a processor and a memory, where the memory stores instructions executable by the processor for implementing the subject matter described herein. In addition, a computer readable medium that implements all or part of the subject matter described herein can be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, of which.

DETAILED DESCRIPTION

The subject matter described herein can be used for any traffic emulation system where the primary objective is to emulate multiple traffic profiles generating traffic at different rates following a certain configured ratio or percentage distribution.

In an application/layer 7 traffic emulation system, one of the most common objectives is to generate traffic at a certain rate configured by the user of the system. The rates covered in this document may be any one of the following:

1. Connection Rate/Connections Initiated Per Second (CPS)
2. Transaction Rate/Transactions Initiated Per Second (TPS)
3. Throughput/Bytes exchanged per second (TPUT)

For the sake of simplicity we can generalize these traffic emulation objectives as operations per second (OPS). The operation can be one connection initiation, one transaction initiation and one byte exchange for CPS, TPS and TPUT objectives, respectively.

When a traffic emulation system emulates multiple traffic profiles (either multiple application profiles, multiple protocol profiles or a mix of application and protocol profiles) simultaneously, the user of the system may need each profile to generate a fixed percentage of the total OPS. In other words, a configured OPS ratio should be maintained across the profiles.

Figure 1:
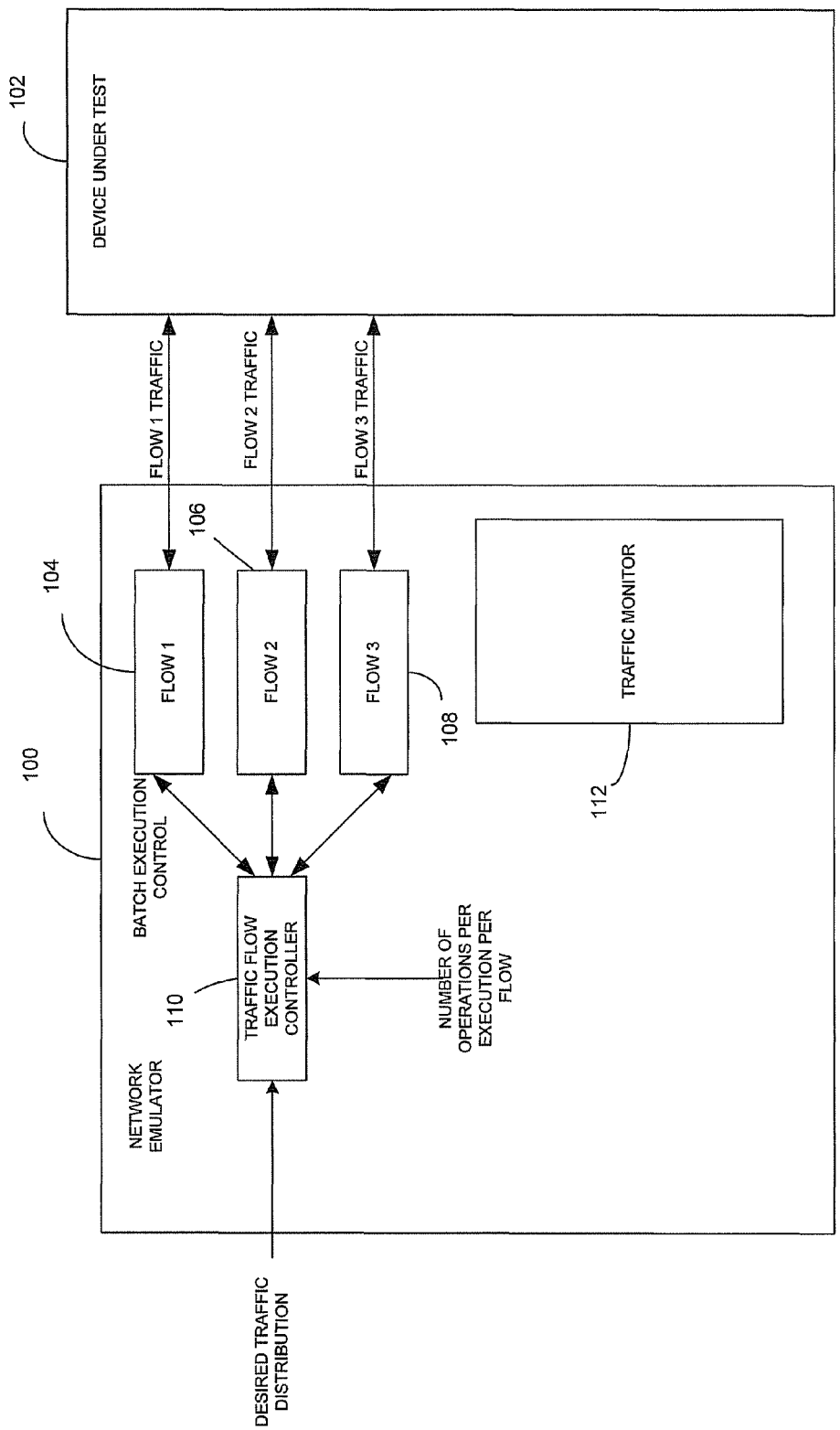
FIG. 1 is a block diagram of a system for generating simulated traffic using different traffic flows and maintaining a configured traffic distribution between the traffic flows and a device under test according to an embodiment of the subject matter described herein.

FIG. 1 is a block diagram of a traffic emulation system that generates simulated network traffic between a plurality of traffic flows and a device under test and maintains a configured distribution among the flows according to an embodiment of the subject matter described herein. Referring to FIG. 1, a traffic emulator 100 sends simulated traffic to and received traffic from a device under test 102. Device under test 102 may be any suitable network device whose functionality is being tested. Examples of such devices include NATs, firewalls, IDSes, IPSes, DPIs, server load balancers, layer 7 accelarators, such as video, storage, or cloud accelerators, WAN optimizers, etc.

Traffic emulator 100 includes traffic flows 104, 106, and 108 that generate different types of traffic between the flows and device under test 102. Each flow 104, 106, and 108 may emulate an application, a protocol, or both. For example, flow 104 may emulate Google traffic, flow 106 may emulate Facebook traffic, and flow 108 may emulate streaming video traffic. If flows 104, 106, and 108 emulate protocols, flow 104 may emulate TCP/IP, flow 106 may emulate SCTP/IP, and flow 108 may emulate UDP/IP.

Each flow 104, 106, and 108 may generate a fixed amount of traffic when executed. For example, flow 104 may generate 500 bytes of information per execution, flow 106 may generate 1,000 bytes per execution, and flow 108 may generate 300 bytes per execution. It may be desirable to execute flows 104, 106, and 108 repeatedly. It may also be desirable to maintain a traffic distribution among the flows. For example, it may be desirable to generate 10% of the traffic from flow 104, 30% from flow 106, and 60% from flow 108.

The desired traffic distribution may be unidirectional or bi-directional. Continuing with the previous example, 10%, 30% and 60% may represent the desired bi-directional (i.e., transmitted and received) traffic generated between each flow and the device under test. Alternatively, if the flows are unidirectional (i.e., transmit only or receive only), the desired distribution may be the desired unidirectional traffic generated by a flow relative to the unidirectional traffic generated by all of the flows.

In order to coordinate execution of the flows so that the desired traffic mix is maintained, traffic flow execution controller 110 is provided. Traffic flow execution controller 110 receives user input regarding the desired traffic distribution across the traffic flows. Traffic flow execution controller 110 may also determine the number of operations per execution per flow by executing each flow and maintaining a count of operations (e.g. bytes transmitted, connection initiations, bytes received, bytes transmitted and received, etc.) per flow. Using this input, traffic flow execution controller 110 assigns a weight to each flow that determines the number of times to execute each flow during execution of a batch and executes the flows in batches according to the assigned weights to generate the desired distribution of traffic between the different flows and device under test 102. Traffic emulator 100 may further include an outgoing traffic monitor 112 that monitors traffic received from device under test 102.

Figure 2:
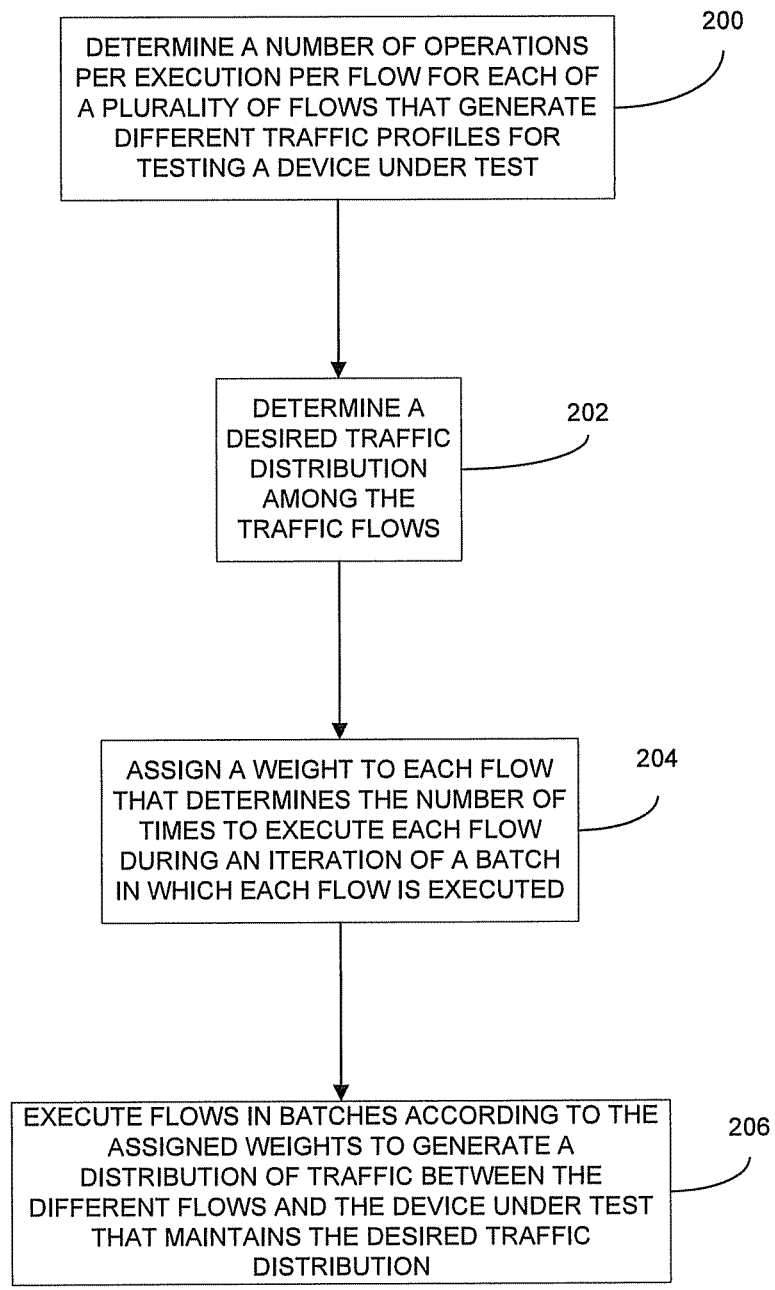
FIG. 2 is a flow chart illustrating exemplary steps of a process for generating simulated traffic using different traffic flows and maintaining a configured traffic distribution between the flows and a device under test according to an embodiment of the subject matter described herein.

FIG. 2 is a flow chart illustrating exemplary steps for generating simulated network traffic from a plurality of different traffic flows and maintaining a configured distribution among the flows according to an embodiment of the subject matter described herein. Referring to FIG. 2, in step 200 a number of operations per execution per flow for each of a plurality of flows that generate different traffic profiles for testing a device under test is determined. For example, traffic flow execution controller 110 may determine the number of operations performed by each of flows 104, 106, and 108. Traffic flow execution controller 110 may make this determination automatically by monitoring each flow or by receiving user input regarding the number of operations performed by each flow. For automatic determination, traffic flow execution controller 110 may monitor the operations per execution per flow periodically and if the number of operations per execution per flow changes, traffic flow execution controller 110 can modify the weights using the new values. If traffic flow execution controller 110 observes that some flow is not doing any operations (for example if a IDS blocks a particular flow), then traffic flow execution controller 110 may remove that flow from the execution and recompute the weights $w_i$ for the remaining flows to maintain their relative percentages. If the blocked flow is allowed at a later point in time, traffic flow execution controller 110 may add it back to the execution and recompute the $w_i$ values again for all the flows according to the original percentages.

In step 202, a desired traffic distribution among the flows is determined. For example, traffic flow execution controller 110 may receive user input regarding the percentage distribution that it is desired to maintain among the flows. For example, it may be desirable to generate 10% of the traffic from flow 104, 30% from flow 106, and 60% from flow 108.

In step 204, a weight is assigned to each flow that determines the number of times to execute each flow during iteration of a batch of flows. Exemplary weight calculations will be described in detail below. Traffic flow execution controller 110 may calculate these weights using any of the algorithms described herein.

In step 206, the flows are executed in batches according to the assigned weights to generate a distribution of traffic from the different flows to and from, to, or from the device under test that maintains the desired traffic distribution. For example, traffic flow execution controller 110 may assign weights to each flow that determines the number of times to execute each of flows 104, 106, and 108 during a batch to maintain the desired traffic distribution.

In step 208, outgoing traffic from the device under test is monitored to determine a performance metric of the device under test. For example, if the device under test is a firewall, outgoing traffic monitor 112 may verify operation of the firewall by confirming that the correct traffic is blocked or passed by the firewall. In a load or stress testing scenario, traffic monitor 112 may monitor the throughput of the firewall for traffic that the firewall is supposed to pass.

In this document, the term flow is used to refer to a traffic generator that generates well-defined traffic profile.

The subject matter described herein assumes that each flow is a defined sequence of actions. Each action performs a defined or quantifiable number of operations. Based on the number of operations performed by each action, it is possible to determine the number of operations that will be performed per execution of a flow (OPF). A ratio (R) may be assigned to each flow, where the ratio R is the total operations performed by one flow in a given batch over the total operations performed by all flows in the batch.

From the OPF and R associated with a flow, a weight (W) is computed for each flow. W is computed in such a way that (W*OPF) values across the flows follows the configured ratio. In other words, for a flow i, $R_i$=the desired percentage of traffic for the flow i, which equals $$\frac{W_i O_i}{\sum_{i=1}^{N} W_i O_i}$$

where $W_i$ is the weight for flow i and $O_i$=the number of operations per execution of flow i, and N is the total number of flows.

A batch of flows is defined in such a way that each single execution of the batch executes each flow W times, but W may be different for different flows. This way the number of operations performed by the flows in a single execution of the batch follows the configured ratio/percentage in a deterministic way (without using random selection).

With the batch properly defined, multiple threads of execution are started in parallel. Each thread executes the same batch again and again in sequence. That way if there are T threads are running in parallel then T number of batches may get executed in parallel and a large number of batches may get executed over time.

The number T is varied to determine a proper value at which the total number of OPS is maximized. This is same as saying batches per second (BPS) is maximized.

Now whatever the maximum BPS may be, since the number of configured ratios is maintained within a batch boundary, the ratios will automatically be maintained across BPS number of batches. If BPS has a significantly large integer, then the ratios will also be maintained per second.

If the lifetime of a batch is so long that it does not finish within one second, then BPS will be a fraction. In that case, the ratios may not be maintained within one second intervals but will be maintained within a longer interval, hence will be maintained on the average if emulation is run for significant amount of time.

The following items will now be described. Together these items ensure that the emulated traffic follows the configured OPS ratios in a deterministic fashion:

1. How the W values are calculated for each flow.
2. How the batch is executed.

The following description includes two approaches of computing the W values. Depending on the way W values are computed, the execution logic of the batch may vary. Varying of the execution logic of a batch based on the W value computation method will also be described below.

The first approach computes W values in such a way that they are always integers. In the second approach, the calculated W values may be real numbers with fractions and the execution process is modified to handle those.

The following terms and variables will be used in describing the subject matter described herein:
N: Number of flows in the configuration.
$O_i$: The number of operations performed per execution of $i^{th}$ flow (OPF), for all i=1, 2, ..., N.
$R_i$: The ratio of OPS that should be maintained by $i^{th}$ flow, for all i=1, 2, ..., N.
$W_i$: The weight calculated for $i^{th}$ flow, i=1, 2, ..., N.
LCM(x,y): The least common multiple two integers x and y.
GCF(x,y): The greatest common factor two integers x and y.
LCM($X_1, X_2, ..., X_n$): LCM (LCM($X_1, X_2, ..., X_{n-1}), X_n$)

First Approach
Calculating $W_i$ Values:

Here we calculate the $W_i$ values as described below.

Here we may assume that $R_i$ is integer, for all i=1, 2, ..., N. If some are not then it is always possible to find out a multiplier which can convert all ratios to integers without changing the distribution.

If $R_i$ values have some common factor then we may first divide the $R_i$ values by the common factor to reduce the $R_i$ values before applying them.

We want the $W_i$ values to be as small as possible.

We calculate $D_i$ as shown below, for all i=1, 2, ..., N:

$$D_i = LCM(O_i, R_i)/R_i$$

Here we may note that $D_i$ will always be an integer.

After that we calculate D as LCM($D_1, D_2, ..., D_n$).

Finally $W_i$ is calculated as $W_i = (D*R_i)/O_i$, for all i=1, 2, ..., N.

Clearly $W_1 O_1, W_2 O_2, ..., W_N O_N$ will follow the ratios $R_1:R_2: ... :R_N$.

Here we may also note that D is divisible by $D_i$ and hence $(D*R_i)$ is divisible by $(D_i*R_i)$. Hence it is divisible by LCM $(O_i, R_i)$ and hence it is divisible by $O_i$. This means $W_i$ is always integer.

Executing a Batch:

Now we define a batch in such a way that one single execution of the batch will execute $i^{th}$ flow $W_i$ number of times, for all i=1, 2, ..., N.

One simple approach can be to first run Flow 1 $W_1$ times, then run Flow 2 $W_2$ times and so on. Finally run Flow N $W_N$ times.

This approach has one issue. It will generate traffic from different traffic profiles in big burst.

So the batch can be executed in an interleaved fashion as described below:

Step 1: Reset all $W_i$ to the calculated values
Step 2: Continue while at least one $W_i$ is non-zero
Step 2.1: Start from i=1 and continue till i=N
Step 2.1.1: If $W_i$ is non-zero
Step 2.1.1.1: Execute Flow i
Step 2.1.1.2: Decrement $W_i$ by 1

In one exemplary implementation, Step 2.1 may be optimized by iterating over a set of flows which is gradually reduced by removing flows for which $W_i$ becomes zero.

The following example illustrates an exemplary calculation of weights to be assigned to flows in a batch.

Let's consider 3 flows and the test objective to be throughput. Let's assume Flow 1, Flow 2 and Flow 3 exchange 300 bytes, 500 bytes and 900 bytes respectively. Let's say we have to maintain a throughput distribution of 20%, 50% and 30% respectively across Flow 1, Flow 2 and Flow 3.

Here $O_1$, $O_2$ and $O_3$ are 300, 500 and 900 respectively. Reduced $R_1$, $R_2$ and $R_3$ values are 2, 5 and 3 respectively.

$$D_1 = LCM(R_1, O_1)/R_1 = 300/2 = 150$$

$$D_2 = LCM(R_2, O_2)/R_2 = 500/5 = 100$$

$$D_3 = LCM(R_3, O_3)/R_3 = 900/3 = 300$$

$$D = LCM(D_1, D_2, D_3) = 300$$

$$W_1 = (D*R_1)/O_1 = 600/300 = 2$$

$$W_2 = (D*R_2)/O_2 = 1500/500 = 3$$

$$W_3 = (D*R_3)/O_3 = 900/900 = 1$$

Figure 3:
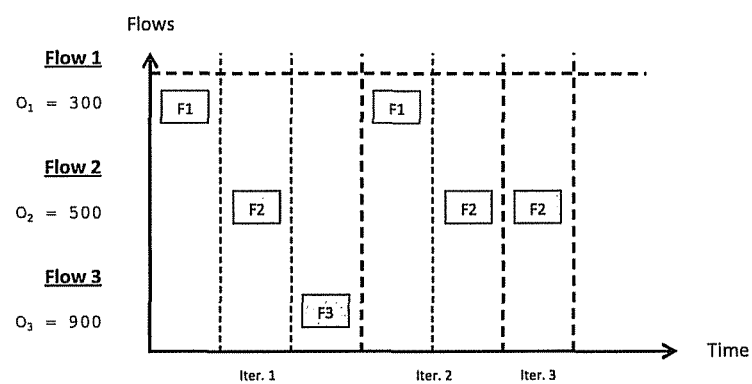
FIG. 3 is a flow diagram illustrating execution of batches that may be performed by a network traffic emulator according to an embodiment of the subject matter described herein.

The batch will be executed as shown in FIG. 3. More particularly, FIG. 3 is a graph illustrating one batch of execution of flows, flow 1, flow 2, and flow 3, where the batch executed the flows in the order $F_1, F_2, F_3, F_1, F_2, F_2$, which maintains the desired traffic distribution of 20%, 50%, and 30%, respectively.

To calculate LCM(x, y), we first calculate GCF(x, y) since GCF calculation is faster than LCM calculation, and then we calculate LCM(x, y) as (x*y)/GCF(x, y). This way of LCM calculation is standard.

Second Approach
Calculating the $W_i$ Values:

We need to compute the weights $W_i$ for each flow such that:

$$W_1*O_1:W_2*O_2:W_3*O_3:W_N*O_N = R_1:R_2:R_3:R_N$$

This can be represented as N−1 individual equations:

$$\frac{W_2 O_2}{R_2} = \frac{W_1 O_1}{R_1}$$

$$\frac{W_3 O_3}{R_3} = \frac{W_1 O_1}{R_1}$$

$$\frac{W_i O_i}{R_i} = \frac{W_1 O_1}{R_1}$$

$$\ldots$$

$$\frac{W_N O_N}{R_N} = \frac{W_1 O_1}{R_1}$$

The equations can be rearranged to get the values of $W_i$ in terms of $R_1$, $O_1$, $W_1$, Ri and $O_i$.

$$W_i = \frac{R_i}{O_i} \frac{O_1}{R_1} W_1$$

We can assume any value of $W_1$ and compute the values of all other weights $W_2, W_3, \ldots W_N$. For simplicity, $W_1$ can be assumed to be 1. This leads to the following equation for computing $W_i$, for all i=2,3, . . . , N:

$$W_i = \frac{R_i}{O_i} \frac{O_1}{R_1}$$

In order to ensure that the weights are all greater than 1, we must choose the $1^{st}$ flow carefully. The first flow should be the one which has the smallest $(R_i/O_i)$ value.

Executing a Batch:

Unlike the first approach, the equation to compute the weights in the second approach does not guarantee integer values for the weights. This requires a change to the execution of the batch from the first approach.

Like the first approach, we can execute the batch by interleaving the flows. However, as the weights $W_i$ can be fractional numbers, we have to take the integer values of the weights $[W_i]$ in executing the batch where [ ] represents the closest integer smaller than or equal to the value. Using the integer smaller than the weight $W_i$ introduces an error for each batch:

$$\Delta_i = W_i - [W_i]$$

If left uncorrected, this error can add up, causing the actual distribution to vary from the configured ratios. In order to correct this error, we maintain each $\Delta_i$ at the end of each batch. Before executing the next batch the $W_i$ is adjusted to $W_i'$ using the following equation:

$$W_i' = W_i + \Delta_i$$

The adjusted $[W_i']$ value is used as the weight for the $i^{th}$ flow in the next batch.

Similarly, the error between $W_i'$ and $[W_i']$ is used as the error for the subsequent batch. This approach guarantees that the error never gets unbounded as eventually $W_i'$ will become greater than $[W_i]+1$ which will mean that $[W_i']$ will be $[W_i]+1$. This means that the error $\Delta_i$ will always be between 0 and 1.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for generating simulated network traffic using a plurality of different traffic flows and maintaining a configured distribution between the flows and a device under test, the method comprising:
   at a network emulator:
      determining a number of operations per flow for each of a plurality of flows that generate simulated network traffic between the flows and a device under test;
      determining a desired traffic distribution among the traffic generated by the traffic flows;
      assigning a weight to each flow that determines the number of times to execute each flow during execution of a batch of flows; and
      executing the flows in batches according to the assigned weights to generate the desired distribution of traffic between the different flows and the device under test;
      wherein each of the weights indicates a number of times to execute a flow in a given batch and wherein executing the flows in batches includes executing each flow $w_i$ times in a given batch, where $w_i$ is the weight that defines the number of times for executing the ith flow in a batch to achieve the desired traffic distribution.

2. The method of claim 1 wherein each of the flows generates application layer traffic between itself and the device under test.

3. The method of claim 1 wherein determining a desired traffic distribution includes receiving input from a user regarding a desired ratio of traffic among the flows.

4. The method of claim 1 wherein the device under test includes at least one of: a network address translator (NAT), a firewall, an intrusion detection system (IDS), an intrusion protection system (IPS), a deep packet inspection (DPI) device, a wide area network (WAN) optimization device, a layer 7 accelerator, and a server load balancer (SLB).

5. The method of claim 1 wherein each value $w_i$ represents a smallest number of times to execute the ith flow to achieve the desired traffic distribution.

6. The method of claim 1 wherein the desired traffic distribution comprises a ratio of a volume of traffic from each flow to a total volume of traffic from all of the flows.

7. A method for generating simulated network traffic using a plurality of different traffic flows and maintaining a configured distribution between the flows and a device under test, the method comprising:
   at a network emulator:
      determining a number of operations per flow for each of a plurality of flows that generate simulated network traffic between the flows and a device under test;
      determining a desired traffic distribution among the traffic generated by the traffic flows;
      assigning a weight to each flow that determines the number of times to execute each flow during execution of a batch of flows; and
      executing the flows in batches according to the assigned weights to generate the desired distribution of traffic between the different flows and the device under test, wherein executing the flows in batches comprises executing the batches in parallel such that the configured distribution is maintained within each batch boundary.

8. The method of claim 1 wherein executing the flows in batches comprises, within each batch, interleaving the $w_i$ executions of the flows with each other.

9. The method of claim 1 wherein executing the flows in batches comprises, within each batch, executing each $i^{th}$ flow $w_i$ times before executing the $(i+1)^{th}$ flow.

10. A method for generating simulated network traffic using a plurality of different traffic flows and maintaining a configured distribution between the flows and a device under test, the method comprising:
   at a network emulator:
      determining a number of operations per flow for each of a plurality of flows that generate simulated network traffic between the flows and a device under test;
      determining a desired traffic distribution among the traffic generated by the traffic flows;
      assigning a weight to each flow that determines the number of times to execute each flow during execution of a batch of flows;
      executing the flows in batches according to the assigned weights to generate the desired distribution of traffic between the different flows and the device under test; and
      monitoring the number of operations per flow and automatically updating the weights in response to changes in the number of operations per flow.

11. A system for generating simulated network traffic using a plurality of different traffic flows and maintaining a configured distribution between the flows and a device under test, the system comprising:
   plurality of traffic flows that generate simulated network traffic between the flows and a device under test; and
   a traffic flow execution controller for determining a number of operations per flow for each of the traffic flows, for determining a desired traffic distribution among the traffic generated by the traffic flows, for assigning a weight to each flow that determines the number of times to execute each flow during execution of a batch of flows, and for executing the flows in batches according to the assigned weights to generate the desired distribution of traffic between the different flows and the device under test;
   wherein each of the weights indicates a number of times to execute a flow in a given batch and wherein executing the flows in batches includes executing each flow $w_i$ times in a given batch, where $w_i$ is the weight that defines the number of times for executing the ith flow in a batch to achieve the desired traffic distribution.

12. The system of claim 11 wherein each of the flows generates application layer traffic between each flow and the device under test.

13. The system of claim 11 wherein determining a desired traffic distribution includes receiving input from a user regarding a desired ratio of traffic among the flows.

14. The system of claim 11 wherein the device under test includes at least one of: a network address translator (NAT), a firewall, an intrusion detection system (IDS), an intrusion protection system (IPS), a deep packet inspection (DPI) device, a wide area network (WAN) optimization device, a layer 7 accelerator, and a server load balancer (SLB).

15. The system of claim 11 wherein each value $w_i$ represents a smallest number of times to execute the ith flow to achieve the desired traffic distribution.

16. The system of claim 11 wherein the desired traffic distribution comprises a ratio of a volume of traffic generated by each flow to a total volume of traffic generated by all of the flows.

17. A system for generating simulated network traffic using a plurality of different traffic flows and maintaining a configured distribution between the flows and a device under test, the system comprising:
   a plurality of traffic flows that generate simulated network traffic between the flows and a device under test; and
   a traffic flow execution controller for determining a number of operations per flow for each of the traffic flows, for determining a desired traffic distribution among the traffic generated by the traffic flows, for assigning a weight to each flow that determines the number of times to execute each flow during execution of a batch of flows, and for executing the flows in batches according to the assigned weights to generate the desired distribution of traffic between the different flows and the device under test, wherein executing the flows in batches comprises executing the batches in parallel such that the configured distribution is maintained within each batch boundary.

18. The system of claim 15 wherein executing the flows in batches comprises, within each batch, interleaving the $w_i$ executions of the flows with each other.

19. The system of claim 15 wherein executing the flows in batches comprises, within each batch, executing each $i^{th}$ flow $w_i$ times before executing the $(i+)^{th}$ flow.

20. A system for generating simulated network traffic using a plurality of different traffic flows and maintaining a configured distribution between the flows and a device under test, the system comprising:
   a plurality of traffic flows that generate simulated network traffic between the flows and a device under test; and
   a traffic flow execution controller for determining a number of operations per flow for each of the traffic flows, for determining a desired traffic distribution among the traffic generated by the traffic flows, for assigning a weight to each flow that determines the number of times to execute each flow during execution of a batch of flows, for executing the flows in batches according to the assigned weights to generate the desired distribution of traffic between the different flows and the device under test for monitoring the number of operations per flow, and for automatically updating the weights in response to changes in the number of operations per flow.

21. A non-transitory computer readable medium having stored thereon executable instructions that when executed by the processor of a computer control the computer to perform steps comprising:
   determining a number of operations per flow for each of a plurality of flows that generate simulated network traffic between the flows and a device under test;
   determining a desired traffic distribution among the traffic generated by the traffic flows;
   assigning a weight to each flow that determines the number of times to execute each flow during execution of a batch of flows; and
   executing the flows in batches according to the assigned weights to generate the desired distribution of traffic between the different flows and the device under test;
   wherein each of the weights indicates a number of times to execute a flow in a given batch and wherein executing the flows in batches includes executing each flow $w_i$ times in a wen batch where $w_i$ is the weight that defines the number of times for executing the ith flow in a batch to achieve the desired traffic distribution.

* * * * *